M. L. & R. W. THORNTON.
Seed Planter.

No. 66,912.

Patented July 16, 1867.

Witnesses:
W. Trewin
F. Blockley

Inventor:
M. L. Thornton
R. W. Thornton
Per Munn & Co
attys

United States Patent Office.

M. L. THORNTON AND R. W. THORNTON, OF LUMPKIN, GEORGIA.

Letters Patent No. 66,912, dated July 16, 1867.

IMPROVEMENT IN CORN AND COTTON-SEED PLANTER.

*The Schedule referred to in these Letters Patent and making part of the same.*

TO ALL WHOM IT MAY CONCERN:

Be it known that we, M. L. THORNTON and R. W. THORNTON, of Lumpkin, in the county of Stewart, and State of Georgia, have invented a new and improved Cotton and Corn-Planter; and we do hereby declare that the following is a full, clear, and exact description thereof, which will enable those skilled in the art to make and use the same, reference being had to the accompanying drawings, forming part of this specification, in which—

Similar letters of reference indicate corresponding parts.

Our invention has for its object to furnish an improved machine, by means of which corn, cotton, or other seeds may be dropped in connection with guano or plaster; and it consists in the combination of the corn and guano-hoppers, dropping-cylinders, shaft, guide-spout, gear-wheels, drive-wheel and shaft with each other and with the frame of the machine; and in the combination of the cotton-seed hopper and stirrer with the guano or plaster-hopper, dropping-cylinder, shaft, spout, gear-wheels, drive-wheel, shaft and frame of the machine, the whole being constructed and arranged as hereinafter more fully described.

Figure 1:
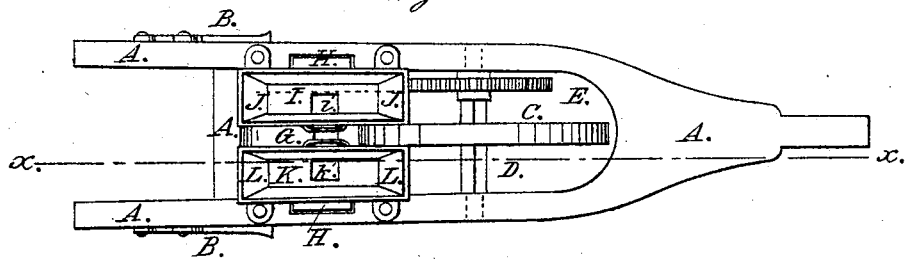
Figure 1 is a top view of our improved machine.
Figure 2:
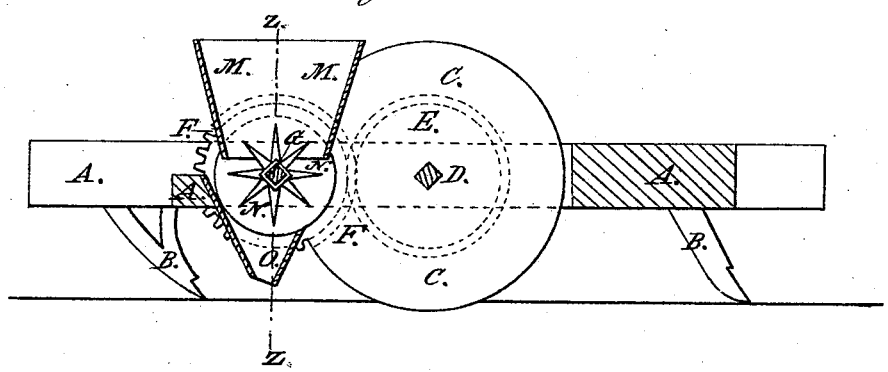
Figure 2 is a vertical longitudinal section of the same, taken through the line $x\,x$, fig. 1, the corn-dropper and hopper being replaced by the cotton-hopper and stirrer.
Figure 3:
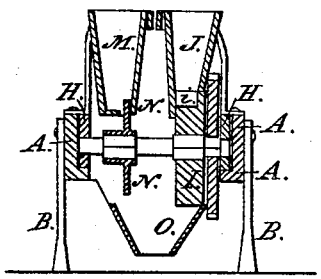
Figure 3 is a vertical cross-section of the same, taken through the line $y\,y$, fig. 2.

A is the frame of the machine, to which the plough-standards B are attached in the ordinary manner. C is the drive-wheel, which is attached to the shaft D so as to carry the said shaft with it in its revolution. The shaft D is pivoted to the frame A, and has a gear-wheel, E, attached to it, the teeth of which mesh into the teeth of the gear-wheel F attached to the shaft G, which revolves in removable bearings H placed in grooves or recesses formed in the inner sides of the longitudinal bars of the frame A, as shown in figs. 1 and 3. I is a cylinder attached to the shaft G, and having a hole, $i$, formed in its face of sufficient size to contain the amount of guano or plaster required for each hill. The cylinder I should be of such a size that each revolution may measure off the space required to be between the hills. J is a bottomless hopper secured to the frame A, and the lower end of which fits so closely upon the surface of the cylinder I that the guano or plaster may be unable to escape between them. K is a cylinder attached to the shaft G, and which is of the same size as the cylinder I, and has a hole, $k'$, formed in it corresponding in position with the hole in the said cylinder I, so that the guano or plaster and the corn may both be dropped at the same time and in the same place. The hole in the cylinder K should be of such a size as to contain the amount of corn required for each hill. L is a hopper attached to the frame A, and fitting upon the cylinder K in the same manner as the hopper J fits upon the cylinder I. When it is desired to use the machine for planting cotton or other seeds in drills, the hopper L and cylinder K are removed, and the hopper M attached to the frame A, said hopper M having a long slit in its bottom for the escape of the seed. N is a stirrer attached to the shaft G, and revolving with said shaft. The wheel or stirrer N is made in the shape of a star, or with long radial teeth, which project into the hopper M through the slit formed in its bottom, and by its action prevents the seed from becoming clogged in the said hopper, and thus insures its regular and uniform escape. O is a spout attached to the frame A of the machine in such a way as to hang beneath the shaft G and its attachments so as to receive the guano or plaster from the one hopper and the seed from the other hopper, and guide them to their proper place in the furrow opened by the forward or central plough, where they are covered by the action of the rear or side ploughs.

We claim as new, and desire to secure by Letters Patent—

1. The combination of the corn and guano-hoppers J and L, dropping-cylinders I and K, shaft G, guide-spout O, gear-wheels E and F, drive-wheel C, and shaft D with each other and with the frame A of the machine, substantially as herein shown and described and for the purpose set forth.

2. The combination of the cotton-seed hopper M and stirrer N with the guano or plaster-hopper J, dropping-cylinder I, shaft G, spout O, gear-wheels E and F, drive-wheel C, shaft D, and frame A of the machine, substantially as herein shown and described and for the purpose set forth.

The above specification of our invention signed by us this 2d day of May, 1867.

M. L. THORNTON,
R. W. THORNTON.

Witnesses:
  C. B. SEYMOUR,
  MARTIN BURKE.